(12) United States Patent
Muegge

(10) Patent No.: US 10,766,404 B2
(45) Date of Patent: Sep. 8, 2020

(54) LIGHTING DEVICE FOR VEHICLES

(71) Applicant: HELLA GmbH & Co. KGaA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 163 days.

(21) Appl. No.: 16/008,762

(22) Filed: Jun. 14, 2018

(65) Prior Publication Data

US 2018/0290586 A1 Oct. 11, 2018

Related U.S. Application Data

(63) Continuation of application No. PCT/EP2016/079933, filed on Dec. 6, 2016.

(30) Foreign Application Priority Data

Dec. 14, 2015 (DE) .................. 10 2015 121 697

(51) Int. Cl.
*B60Q 1/26* (2006.01)
*G03H 1/22* (2006.01)
(Continued)

(52) U.S. Cl.
CPC ............ *B60Q 1/2607* (2013.01); *F21S 43/13* (2018.01); *F21S 43/14* (2018.01); *F21S 43/26* (2018.01);
(Continued)

(58) Field of Classification Search
CPC ........ B60Q 1/2607; F21S 43/13; F21S 43/14; F21S 43/40; F21S 43/31; F21S 43/26; G02B 5/32; G02H 1/2202
(Continued)

(56) References Cited

U.S. PATENT DOCUMENTS 5,455,747 A 10/1995 Aoyama
9,348,149 B2 * 5/2016 Kurashige ............ G02B 5/0252
(Continued)

FOREIGN PATENT DOCUMENTS

DE 4421306 A1 1/1995
DE 102013108333 A1 2/2015
(Continued)

OTHER PUBLICATIONS

International Search Report dated Feb. 15, 2017 in corresponding application PCT/EP2016/079933.

*Primary Examiner* — Bryon T Gyllstrom
(74) *Attorney, Agent, or Firm* — Muncy, Geissler, Olds & Lowe, P.C.

(57) ABSTRACT

A lighting device for vehicles having a housing in which is arranged a hologram light fixture that has a light source unit and has an optical unit with a hologram element for generating a predetermined lighting function. An auxiliary element is associated with the light source unit, by means of which light that is emitted by the light source unit can be deflected in the direction of the hologram element. In this design, the light source unit and/or the auxiliary element is arranged in the region of a side of the hologram element or in the region of a lateral extension of an edge of the hologram element extending in the direction of a central axis of the hologram element.

11 Claims, 4 Drawing Sheets

(51) Int. Cl.
*F21S 43/14* (2018.01)
*F21S 43/20* (2018.01)
*F21S 43/31* (2018.01)
*F21S 43/40* (2018.01)
*F21S 43/13* (2018.01)
*G02B 5/32* (2006.01)

(52) U.S. Cl.
CPC ............... *F21S 43/31* (2018.01); *F21S 43/40* (2018.01); *G02B 5/32* (2013.01); *G03H 1/2286* (2013.01); *G03H 1/2202* (2013.01); *G03H 2001/2231* (2013.01); *G03H 2001/2234* (2013.01); *G03H 2222/34* (2013.01); *G03H 2227/06* (2013.01)

(58) Field of Classification Search
USPC ......................................................... 362/509
See application file for complete search history.

(56) References Cited

U.S. PATENT DOCUMENTS

| | | | | |
|---|---|---|---|---|
| 9,611,989 | B1* | 4/2017 | Isaacson | G09F 13/00 |
| 2002/0027678 | A1* | 3/2002 | Halldorsson | B60K 35/00 |
| | | | | 359/15 |
| 2002/0154349 | A1* | 10/2002 | Halldorsson | B60K 35/00 |
| | | | | 359/15 |
| 2002/0159111 | A1* | 10/2002 | Suzuki | G02B 5/32 |
| | | | | 359/32 |
| 2010/0157252 | A1* | 6/2010 | Itoh | G03B 21/2013 |
| | | | | 353/31 |
| 2011/0249460 | A1* | 10/2011 | Kushimoto | B60Q 1/085 |
| | | | | 362/510 |
| 2011/0267666 | A1* | 11/2011 | Redmond | G03H 1/0408 |
| | | | | 359/32 |
| 2012/0098819 | A1* | 4/2012 | Furuya | G02B 5/32 |
| | | | | 345/212 |
| 2013/0141527 | A1* | 6/2013 | Shimizu | G02B 5/32 |
| | | | | 348/40 |
| 2013/0222384 | A1* | 8/2013 | Futterer | H04N 13/344 |
| | | | | 345/426 |
| 2014/0218778 | A1* | 8/2014 | Hall | G03H 1/0465 |
| | | | | 359/3 |
| 2017/0184270 | A1* | 6/2017 | Kim | F21S 43/00 |

FOREIGN PATENT DOCUMENTS

| | | |
|---|---|---|
| FR | 2985325 A1 | 7/2013 |
| JP | H08108793 A | 4/1996 |
| JP | H08216778 A | 8/1996 |
| JP | H0939653 A | 2/1997 |
| JP | 2000225889 A | 8/2000 |
| KR | 20150134979 A | 12/2015 |

* cited by examiner

LIGHTING DEVICE FOR VEHICLES

This nonprovisional application is a continuation of International Application No. PCT/EP2016/079933, which was filed on Dec. 6, 2016, and which claims priority to German Patent Application No. 10 2015 121 697.3, which was filed in Germany on Dec. 14, 2015, and which are both herein incorporated by reference.

BACKGROUND OF THE INVENTION

Field of the Invention

The present invention relates to a lighting device for vehicles having a housing in which is arranged a hologram light fixture that has a light source unit and has an optical unit with a hologram element for generating a predetermined lighting function.

Description of the Background Art

Known from DE 44 21 306 C2, which corresponds to U.S. Pat. No. 5,455,747, is a lighting device for vehicles in which a hologram light fixture is integrated. This fixture includes a hologram element that is applied onto a cover plate that terminates a housing of the lighting device. Associated with the hologram element is a light source unit that extends in the primary direction of emission behind the cover plate or behind the hologram element. It is disadvantageous of the known hologram light fixture that it requires a relatively large installation space and that the light source unit is visible directly behind the hologram element.

SUMMARY OF THE INVENTION

It is therefore an object of the present invention to provide a lighting device for vehicles having a hologram light fixture such that at least one predetermined lighting function is created with a space-saving arrangement of components of the hologram light fixture and in which the light source unit is not directly perceptible to an observer of the hologram light fixture.

To attain this object, an exemplary embodiment of the invention provides an auxiliary element associated with the light source unit, via which light that is emitted by the light source unit can be deflected in a direction of the hologram element for generation of a virtual light source unit and for reconstruction of the hologram, and in that the light source unit and/or the auxiliary element is arranged in the region of a side of the hologram element or in the region of a lateral extension of an edge of the hologram element extending in the direction of a central axis of the hologram element.

An auxiliary element that redirects light emitted by the light source unit in the direction of the hologram element is integrated into the hologram light fixture. With the redirection of the light, the auxiliary element generates for the hologram light fixture a virtual light source for reconstruction of the hologram that corresponds to the reference light source in the creation of the hologram. The light source unit and the auxiliary element are each arranged in a lateral region of the hologram element. The hologram light fixture is given a compact construction in this way. In particular, the overall depth of the hologram light fixture or of the lighting device can advantageously be reduced by this means. Since the light source unit is not arranged behind the hologram element, the light source unit is not visible, or is only visible with difficulty, from outside.

The light source unit and the auxiliary element can be arranged relative to the hologram element such that a depth extent extending in the primary direction of emission of the lighting device is smaller than a height extent extending transversely to the primary direction of emission with respect to the external components of the hologram light fixture. Expressed in another way, the external dimension of the components of the hologram light fixture is smaller in the direction along the primary direction of emission than in the direction transverse to the primary direction of emission. A hologram light fixture with a small overall depth can advantageously be realized by this means.

The auxiliary element can be arranged in the region of a first edge of the hologram element, and the light source unit is arranged in the region of an opposite, second edge of the hologram element. As a result of the arrangement of the light source unit and the auxiliary element opposite one another, a virtual light source for the hologram light fixture is produced that appears to be located behind the auxiliary element and that illuminates the hologram element. The overall depth thus appears virtually to be far greater than it is in actuality. Moreover, the lateral arrangement of the light source unit and of the auxiliary element makes it possible for the space behind the hologram element to be free of optical components. Consequently, the light source unit, at least, is not discernable from outside.

The hologram element can have at least two different optical structures for the generation of two different lighting functions. A first optical structure is associated with a first light source unit and with a first auxiliary element for the generation of a first lighting function. A second optical structure of the same hologram element is associated with a second light source unit and with a second auxiliary element for the generation of a second lighting function. In advantageous fashion, at least two lighting functions can be generated in a space-saving manner by this means.

The light source unit and the auxiliary element can be arranged in the region of the same side of the hologram element so that the hologram light fixture can be designed to be relatively tapered on the opposite side. This embodiment is especially suitable for a backswept lamp housing.

The hologram element can be arranged as a transmission hologram element. In advantageous fashion, the hologram element in this design can constitute a front termination of the hologram light fixture, for example through integration into a cover plate of the housing. According to an alternative improvement of the invention, the hologram element can also be implemented as a reflection hologram element, wherein the reflection hologram element essentially constitutes a rear termination of the hologram light fixture.

Multiple auxiliary elements can be arranged between the light source unit and the hologram element. In this way, an especially flat, space-saving construction of the lighting device is possible.

A lens optical unit can be situated immediately in front of the light source unit, wherein the lens optical unit is provided with a number of identically designed lens segments corresponding to the number of light sources of the light source unit. In this way, the light source unit can advantageously emit light with a higher luminous flux or higher light intensity so that especially high-luminosity signal functions, for example brake light, turn-signal light, and daytime running light, can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A lighting device according to the invention can be used for the generation of signal functions, for example a turn signal, taillight, brake light, position light, or daytime running light function. It may be used in the rear end or the front end of the vehicle, in particular of the motor vehicle, or as any other light.

Figure 1:
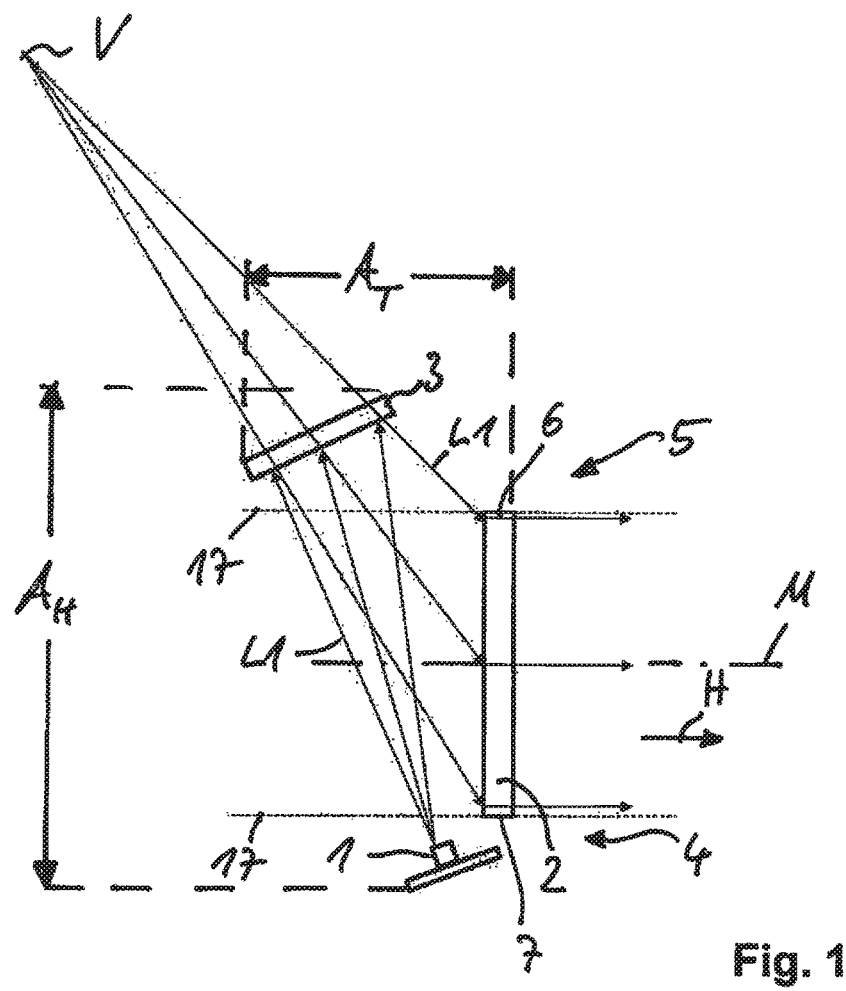
FIG. 1 is a schematic side view of a hologram light fixture.

According to an embodiment of the lighting device from FIG. 1, a hologram light fixture, which has a light source unit 1 and an optical unit for the generation of a predetermined lighting function, is integrated into the lighting device, which can have multiple lamp compartments for the generation of a multiplicity of lighting functions. The hologram light fixture is arranged in a housing of the lighting device, wherein an opening in the housing located on the front in the primary direction of emission H is closed by a transparent cover plate.

The optical unit of the hologram light fixture includes a hologram element 2 that preferably is flat in design and that is arranged to be substantially perpendicular to the primary direction of emission H, and includes a reflective auxiliary element 3. The auxiliary element 3 serves to deflect and to orient a light beam L1 emitted by the light source unit 1 in the direction of the hologram element 2 for generation of a virtual light source V, wherein a hologram is reconstructed with the light beam L1 that is thus deflected and oriented. The hologram in this case is stored in the hologram element 2 as an optical structure containing light information. As is evident from FIG. 1, the light source unit 1 is located in the region of a first side 4 of the hologram element 2, while the auxiliary element 3 is arranged on an opposite, second side 5 of the hologram element 2. The light source unit 1 is arranged closer to the hologram element 2 than the auxiliary element 3 is. The light source unit is located immediately in the region of the first side 4 of the hologram element 2.

The auxiliary element 3 is arranged to be offset from the light source unit 1 in the primary direction of emission H so that the light rays L1 that arrive from the light source unit 1 and are reflected strike the entire rear surface of the hologram element 2. The auxiliary element 3 is located in lateral extension 17 of a first edge 6 of the hologram element 2 arranged on the second side 5 of the same, wherein it is arranged to be offset from the light source unit 1 opposite the primary direction of emission H. The light source unit 1 is located in the region of an opposite, second edge 7 of the hologram element 2. As a result of the arrangement of the light source unit 1 and the auxiliary element 3 opposite one another, a virtual light source V for the hologram element 2 is produced that appears to be located behind the auxiliary element 3. Both the light source unit 1 and the auxiliary element 3 extend beyond the edges 6, 7 of the hologram element 2 when viewed from a center plane or axis M of the hologram element 2 extending in the primary direction of emission H. Thus, none of these optical components behind the hologram element 2 is visible or discernable from outside. It is assumed that the hologram element 2 is attached in an opaque surround. Alternatively, the hologram element 2 can also be integrated into the cover plate so that the housing of the lighting device adjoins the edge 6, 7 of the hologram element 2. A height extent $A_H$, which runs transversely to the primary direction of emission H or in the direction of the hologram element 2, is thus determined by the outside edges of the light source unit 1 and of the auxiliary element 3 in the exemplary embodiment shown in FIG. 1. This height extent $A_H$ is greater than a depth extent $A_T$ running in the primary direction of emission H or transversely to the hologram element 2, which, in the exemplary embodiment shown in FIG. 1, is determined by the distance between the outside edges of the hologram element 2 and of the auxiliary element 3. In advantageous fashion, the hologram light fixture has a small overall depth as a result. Preferably, the depth extent $A_T$ is in a range from 30 mm to 100 mm. Preferably, the height extent $A_H$ is in a range from 50 mm to 120 mm. It should be noted that the hologram light fixture can also be arranged to be rotated by 90° with respect to the central axis M so that the light source unit 1 and the auxiliary element 3 are located in a common horizontal plane. In the present exemplary embodiment, the light source unit 1 and the auxiliary element 3 are located in a common vertical plane.

The light source unit 1 can be implemented as an individual light source, for example as an LED light source or as a laser diode.

Figure 7A:
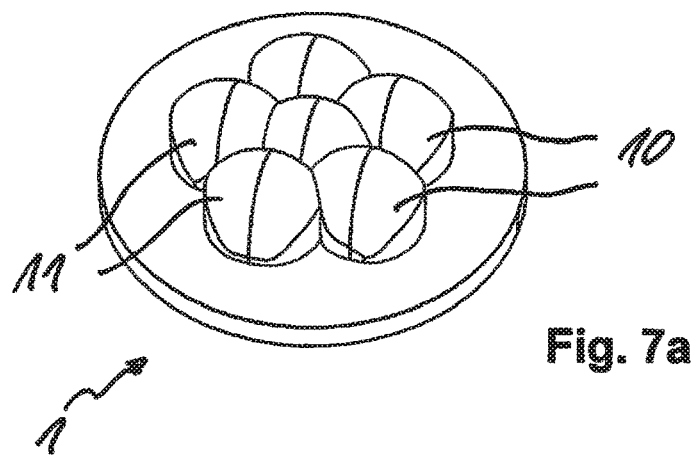
FIG. 7a is a perspective front view of a light source unit with multiple light sources and with a lens optical unit situated in front thereof.
Figure 7B:
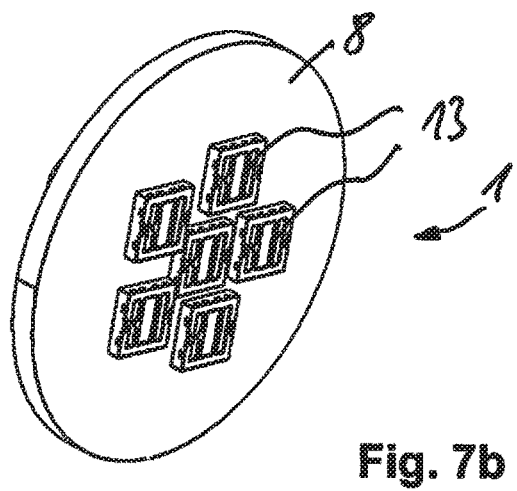
FIG. 7b is a perspective front view of the light source unit with six light sources arranged on a carrier.
Figure 7C:
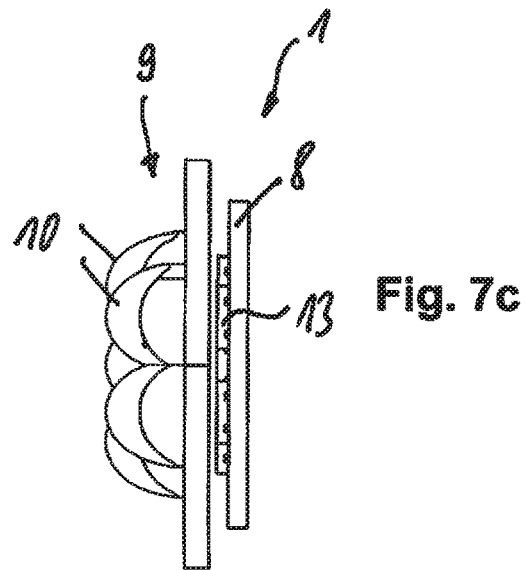
FIG. 7c is a side view of the light source unit and the lens optical unit situated in front thereof.

According to an embodiment of the invention from FIGS. 7a to 7c, the light source unit 1 can also have multiple light sources 13, which can be arranged on a common carrier 8 (printed circuit board). Arranged in front of the light source unit 1 in the direction of light emission is a lens optical unit 9, which has a plurality of lens segments 10. The number of lens segments 10 matches the number of light sources 13. The lens segments 10 are each associated with a single light source 13. The lens segments 10 each have identical lens surfaces 11, with the result that the light given off by the light sources 13 is projected in the same direction. In advantageous fashion, a relatively high-luminosity light source unit 1 can be realized in this way that preferably is intended for the generation of high-luminosity signal functions, such as brake light, turn-signal light, or daytime running light.

According to an embodiment, it is also possible for a lens in the immediate vicinity of the light source unit 1 in the embodiment from FIG. 1 to be associated with the same so that a greater luminous flux can strike the auxiliary element 3.

The auxiliary element 3 has a reflective surface so that light striking it can be reflected in the direction of the hologram element 2.

Figure 2:
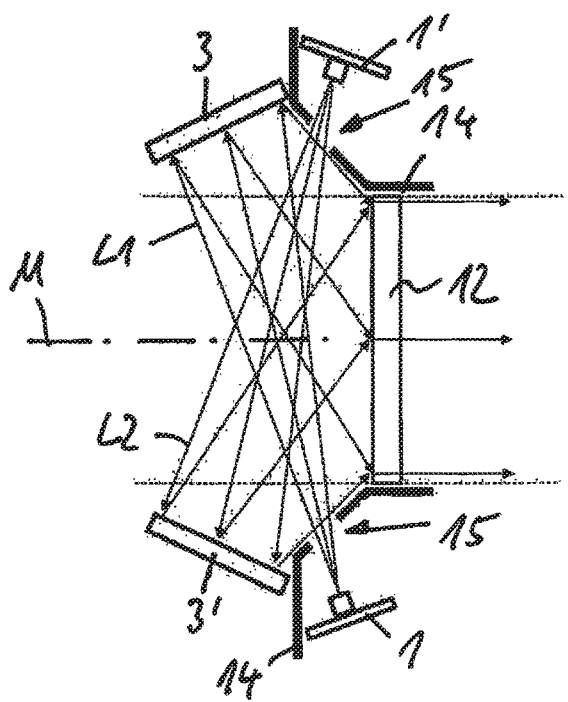
FIG. 2 is a schematic side view of a hologram light fixture containing two light source units and two auxiliary elements.

According to an embodiment of the invention from FIG. 2, the hologram light fixture is adapted so that a single hologram element 12 serves to generate two lighting functions. The structure of the hologram light fixture from FIG. 2 corresponds to the embodiment from FIG. 1 with respect to the achievement of a first lighting function. The first light source unit 1 and the first auxiliary element 3 located opposite thereto are provided for the purpose of generating the first lighting function. For the purpose of generating the second lighting function, a second light source unit 1' and a second auxiliary element 3' are provided, which are arranged in mirror image to the first light source unit 1 and to the first auxiliary element 3 with respect to a horizontal plane passing through the central axis M. The second light source unit 1' emits a second light beam L2, which is reflected at the second auxiliary element 3' in the direction of the hologram element 12. The hologram element 12 has two optical structures in the present exemplary embodiment. The first optical structure serves to generate the first lighting function. The second optical structure serves to generate the second lighting function.

It should be noted that the hologram elements 2, 12 are each implemented as a holographic optical element having diffractive optical elements. These are small optical structures that bend the light in a limited spectral and/or angular range. The diffractive optical elements can be implemented as grating, lens, or mirror beam splitters and/or as a combination thereof.

The hologram element 2, 12 is implemented as a volume hologram element, for example in the form of an emulsion or a film. The hologram element 2, 12 is joined by adhesive bonding or by welding and/or by ultrasonic welding to a carrier. Alternatively, the hologram element 2, 12 can also be preformed by deep drawing so that it is overcoated as an insert in an injection mold with a transparent material that forms the flat and transparent carrier. The carrier is designed to be transparent, for example is designed as a lamp lens. The carrier is, for example, attached to a holder 14 of the housing, which can serve at the same time as a mask for the auxiliary elements 3, 3'. The holder 14 has two openings 15 so that only light L1, L2 is allowed through that is intended to strike the auxiliary element 3, 3' located opposite. Stray radiation in the direction of the auxiliary element 3, 3' located on the same side of the hologram element 12 or on the hologram element 12 itself is consequently avoided.

Figure 3:
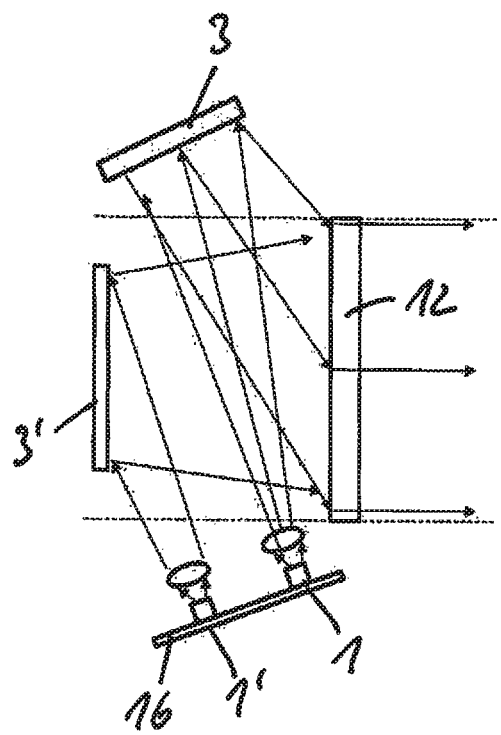
FIG. 3 is a schematic side view of a hologram light fixture.

According to an embodiment of the invention from FIG. 3, two lighting functions can also be generated in that the two light source units 1, 1' can be arranged on the same side of the hologram element 12. While the first auxiliary element 3 associated with the first light source unit 1 is arranged on the other side of the hologram element 12, a second auxiliary element 3' associated with the second light source unit 1' is arranged behind the hologram element 2 in the primary direction of emission H. In advantageous fashion, the light source units 1, 1' can be arranged on a common carrier 16 in this embodiment.

Figure 4:
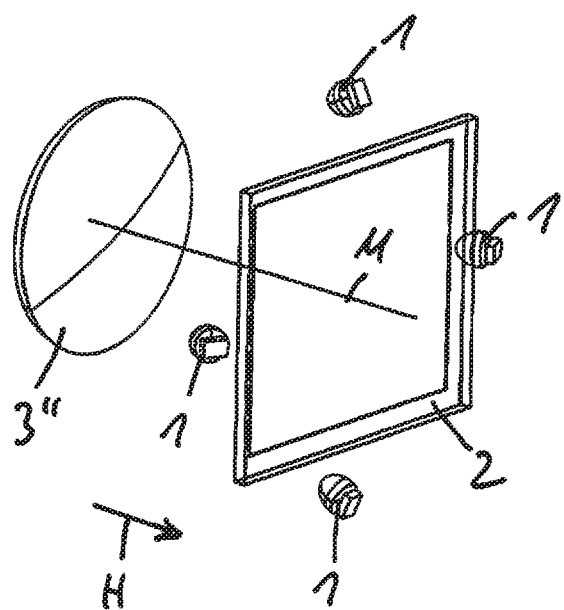
FIG. 4 is perspective front view of a hologram light fixture.

According to an embodiment of the invention from FIG. 4, multiple light source units 1 are arranged circumferentially to the hologram element 2, wherein one and the same auxiliary element 3" is associated with the light source units 1. The auxiliary element 3" is arranged behind the hologram element 2 in the primary direction of emission H. A relatively high-luminosity lighting function can consequently be generated by the multiplicity of light source units 1.

Figure 5:
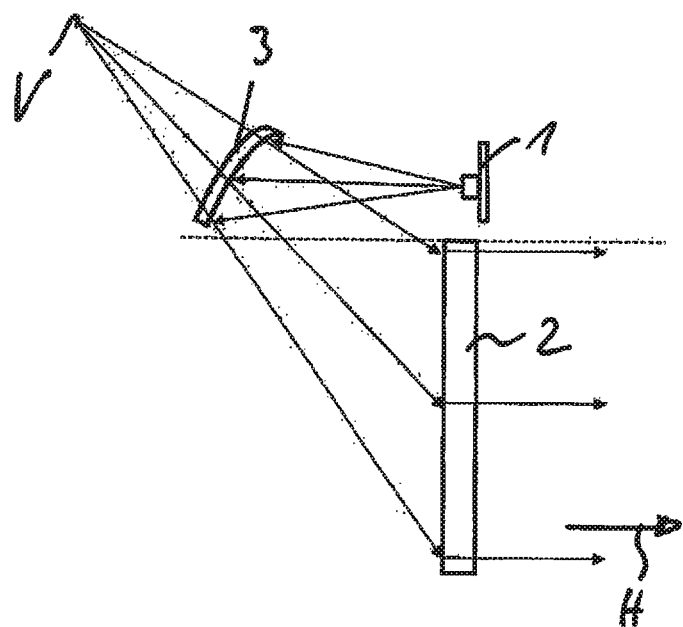
FIG. 5 is a schematic side view of a hologram light fixture.

According to an embodiment of the invention from FIG. 5, the light source unit 1 and the reflective auxiliary element 3 are arranged on the same side of the hologram element 2, wherein the light source unit 1 is arranged to be oriented opposite the primary direction of emission H. Since the opposite side, here the bottom side, of the hologram element 2 is free of optical components, this variant of the hologram light fixture can also be arranged, in particular, in a backswept housing of the lighting device.

Figure 6:
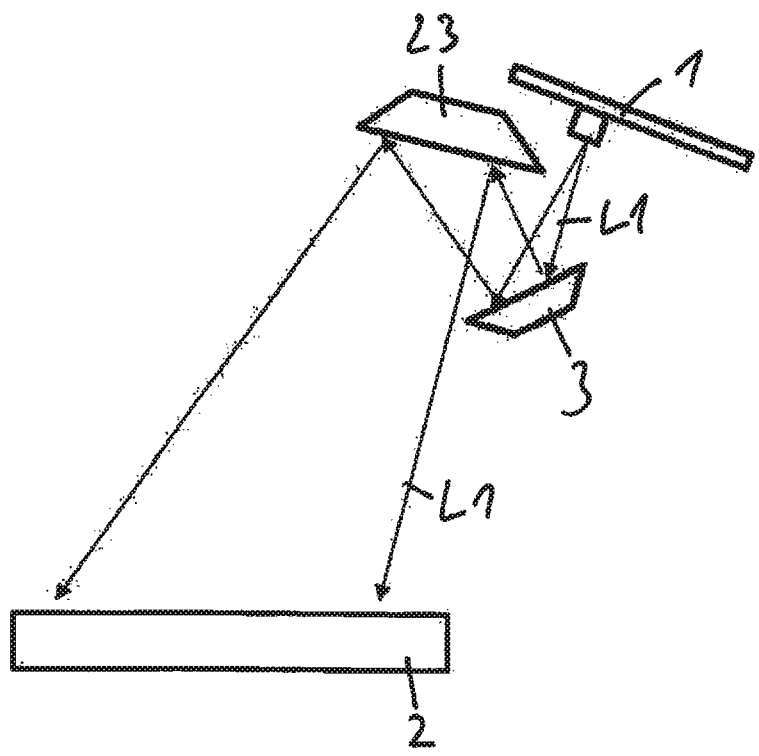
FIG. 6 is a schematic side view of a hologram light fixture.

According to an embodiment of the invention from FIG. 6, in order to improve the space-saving arrangement, in particular to minimize the depth extent or the outside distance between the light source unit 1 and the hologram element 2, two auxiliary elements 3, 23 can be arranged in the luminous flux between the light source unit 1 and the hologram element 2. Consequently, double reflection takes place, wherein the light beam L1 striking the first auxiliary element 3 is reflected in the direction of the second auxiliary element 23. The light beam L1 is reflected from the second auxiliary element 23 to the surface of the hologram element 2.

According to an embodiment, the hologram element 12 can also have more than two different optical structures so that more than two lighting functions can be generated.

The hologram light fixtures described in the exemplary embodiments each have hologram elements 2, 12 that are implemented as transmission hologram elements. According to an embodiment of the invention, the hologram elements can also be implemented as reflection hologram elements, wherein the light source unit 1 and the auxiliary element 3, 23 are not arranged behind the hologram element, as in the case of the transmission hologram element, but instead are arranged in front of the hologram element in the primary direction of emission.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
   a housing;
   a hologram light fixture arranged in the housing, the hologram light fixture having a light source unit and an optical unit with a hologram element for generating a predetermined lighting function; and
   an auxiliary element associated with the light source unit, wherein via the auxiliary element, light that is emitted by the light source unit is adapted to be deflected and oriented in a direction of the hologram element to generate a virtual light source and to reconstruct a hologram,
   wherein the light source unit and/or the auxiliary element is arranged in a region of a side of the hologram element or in a region of a lateral extension of an edge of the hologram element extending in a direction of a central axis of the hologram element, and
   wherein with respect to a lateral direction that runs parallel to a primary direction of emission of the hologram element, the auxiliary element is arranged to be offset from the light source unit such that, in the lateral direction, a distance between the hologram element and the light source unit is smaller than a distance between the hologram element and the auxiliary element.

2. The lighting device according to claim 1, wherein a depth extent between the hologram element and the auxiliary element, that extends in the primary direction of emission of the hologram element, is smaller than a height extent extending transversely to the primary direction of emission that runs between the light source unit and the auxiliary element or between the light source unit or the auxiliary element and an edge of the hologram element arranged on a side facing away from the light source unit or the auxiliary element.

3. The lighting device according to claim 2, wherein the depth extent is in a range from 30 mm to 100 mm, and the height extent is in a range from 50 mm to 120 mm.

4. The lighting device according to claim 1, wherein the auxiliary element is arranged in the region of a first edge of the hologram element, and wherein the light source unit is arranged in the region of an opposite, second edge of the hologram element.

5. The lighting device according to claim 1, wherein the light source unit includes a first light source unit and a second light source unit and the auxiliary element includes a first auxiliary element and a second auxiliary element, and wherein the hologram element has at least two different optical structures so that a first optical structure serves in interaction with the first light source unit and with the first auxiliary element for the generation of a first lighting function, and a second optical structure serves in interaction with the second light source unit and with the second auxiliary element for the generation of a second lighting function.

6. The lighting device according to claim 1, wherein the hologram element has a center axis that extends in the primary direction of emission of the hologram element, and wherein the light source unit and the auxiliary element are both arranged in a region provided on a same side of the hologram element with respect to the center axis.

7. The lighting device according to claim 6, wherein the light source unit is arranged such that light emitted therefrom is emitted in an opposite direction as the primary direction of emission of the hologram element.

8. The lighting device according to claim 1, wherein the hologram element is implemented as a transmission hologram element, wherein at least the light source unit or the auxiliary element is arranged behind the transmission hologram element in the primary direction of emission of the hologram element or wherein the hologram element is implemented as a reflection hologram element, and wherein at least the light source unit or the auxiliary element is arranged in front of the reflection hologram element in the primary direction of emission.

9. The lighting device according to claim 6, wherein at least two of the auxiliary element are provided between the light source unit and the hologram element.

10. The lighting device according to claim 1, wherein the light source unit has at least two light sources, LED light sources, or laser diodes, wherein arranged immediately in front of the light source unit is a lens optical unit that has a number of lens segments matching the number of light sources, and wherein the lens segments are each associated with one light source of the light source unit.

11. A lighting device for a vehicle, the lighting device comprising:
    a housing;
    a hologram light fixture arranged in the housing, the hologram light fixture having a light source unit and an optical unit with a hologram element for generating a predetermined lighting function; and
    an auxiliary element associated with the light source unit, wherein via the auxiliary element, light that is emitted by the light source unit is adapted to be deflected and oriented in a direction of the hologram element to generate a virtual light source and to reconstruct a hologram,
    wherein the light source unit and/or the auxiliary element is arranged in a region of a side of the hologram element or in a region of a lateral extension of an edge of the hologram element extending in a direction of a central axis of the hologram element,
    wherein the light source unit includes a first light source unit and a second light source unit and the auxiliary element includes a first auxiliary element and a second auxiliary element, and wherein the hologram element has at least two different optical structures so that a first optical structure serves in interaction with the first light source unit and with the first auxiliary element for the generation of a first lighting function, and a second optical structure serves in interaction with the second light source unit and with the second auxiliary element for the generation of a second lighting function, and
    wherein the first light source unit and the second light source unit and the first auxiliary element and the second auxiliary element, are in each case arranged in the region of opposite sides of the same hologram element.

* * * * *